United States Patent [19]
Meixner et al.

[11] Patent Number: 5,259,749
[45] Date of Patent: Nov. 9, 1993

[54] APPARATUS FOR FEEDING SYNTHETIC RESIN MATERIAL TO INJECTION MOLDING AND EXTRUDER UNITS

[75] Inventors: Franz Meixner; Peter Brams, both of Munich; Sven Schultheis, Augsburg, all of Fed. Rep. of Germany

[73] Assignee: Krauss Maffei AG, Munich, Fed. Rep. of Germany

[21] Appl. No.: 734,193

[22] Filed: Jul. 22, 1991

[30] Foreign Application Priority Data

Aug. 7, 1990 [DE] Fed. Rep. of Germany ....... 4024994

[51] Int. Cl.⁵ .................. B29B 7/60; B29C 45/18; B29C 45/48
[52] U.S. Cl. .................... 425/205; 425/207; 425/208; 425/209; 425/582; 425/584; 425/587; 366/156
[58] Field of Search ............... 425/205, 209, 207, 200, 425/580, 582, 584, 587, 585, 208; 366/156, 151, 181, 182

[56] References Cited

U.S. PATENT DOCUMENTS

| | | | |
|---|---|---|---|
| 1,156,096 | 10/1915 | Price | 425/203 |
| 3,633,494 | 1/1972 | Schippers | 100/90 |
| 5,030,080 | 7/1991 | Fukuda et al. | 425/587 |

FOREIGN PATENT DOCUMENTS

| | | |
|---|---|---|
| 0286972 | 4/1988 | European Pat. Off. |
| 1809226 | 7/1969 | Fed. Rep. of Germany . |
| 1554855 | 1/1970 | Fed. Rep. of Germany . |
| 1805868 | 5/1970 | Fed. Rep. of Germany . |
| 2218353 | 10/1973 | Fed. Rep. of Germany . |
| 206343 | 1/1984 | Fed. Rep. of Germany . |
| 3505175 | 8/1986 | Fed. Rep. of Germany ...... 366/156 |
| 3600566 | 7/1987 | Fed. Rep. of Germany . |
| 260891 | 10/1988 | Fed. Rep. of Germany . |
| 3712828 | 12/1989 | Fed. Rep. of Germany . |
| 392045 | 9/1965 | Switzerland . |
| 1008429 | 10/1965 | United Kingdom . |

OTHER PUBLICATIONS

Patent Abstract, vol. 7, No. 250 Japan 58-134704; Aug. 1983.
Patent Abstract, vol. 10, No. 261 Japan 61-086218; May 1986.
Patent Abstract, vol. 9, No. 272 Japan 60-116424; Jun. 1985.

*Primary Examiner*—Jay H. Woo
*Assistant Examiner*—Khanh P. Nguyen
*Attorney, Agent, or Firm*—Herbert Dubno

[57] ABSTRACT

A highly viscous or dough-like material, especially glass fiber-filled polyester, polyamide or polypropylene is fed from a rotating funnel via a feed worm lying along a generatrix of the funnel directly into an extruder or an injection molding cylinder and without passing through an elbow or other jacket. The system is thereby able to operate at reduced pressure with least damage to the fibers and reduced drive energy for the feed worm or screw.

15 Claims, 4 Drawing Sheets

APPARATUS FOR FEEDING SYNTHETIC RESIN MATERIAL TO INJECTION MOLDING AND EXTRUDER UNITS

FIELD OF THE INVENTION

Our present invention relates to a feeding of viscous materials in systems in which a viscous material, e.g. a synthetic resin, can be driven through an outlet of an elongated chamber, e.g. by an injection molding piston and/or an extruder or feed worm. More particularly, the invention relates to the feeding of viscous and dough-like consistency materials and especially fiber-filled synethtic resins, e.g. glass fiber-filled polyesters, polyamides and polypropylene, for the extrusion or injection molding thereof as part of an extrusion or injection molding machine.

BACKGROUND OF THE INVENTION

In machines for handling viscous or doughy-consistency synthetic resin compositions, it is known to provide a funnel which can be equipped with a feed worm or screw which can communicate via an elbow with a chamber into which the synthetic resin material is to be fed for ultimate extrusion or injection molding by a movable member in this chamber (see German patent 37 12 828).

In the processing of highly viscous materials, especially. for example, glass fiber-filled polyesters, these systems require the material flow to overcome significant resistance. In practice it has been found that to overcome this resistance, the feed unit must supply extremely high pressures, for example 60 to 70 bar, and thus must draw high drive power. The volume flow rate is detrimentally influenced by the need to overcome this resistance and thus the rate at which an injection molding machine, for example, can cycle, can be detrimentally effected as well.

It has been found, moreover, that the fibers contained in the synthetic resin may be damaged by the high pressures and the stresses to which the material may be subjected under these conditions and frequently the metering or extrusion cylinder is filled with the plastic material to a lesser degree than might otherwise be desirable.

Since glass fiber-filled plastic bodies are increasingly utilized in modern technology, especially for the automotive industry, and the fabrication of these products may require a number of operating steps with prior apparatus of the type described, the conventional system obviously has significant drawbacks.

As a consequence, it has been necessary heretofore to fabricate flat mats of the glass fiber-filled synthetic resin and to shape these mats under high pressure and high temperatures in appropriate molds or dies. Such processes are time-consuming and of low efficiency.

OBJECTS OF THE INVENTION

It is, therefore, the principal object of the present invention to provide a system for feeding viscous materials, and fiber-filled synthetic resin in particular, whereby these drawbacks are avoided.

Another object of the invention is to provide an apparatus for the feeding of such materials which is less detrimental to the fibers, which can be operated continuously or at a higher cycling rate than has been possible heretofore and which will consume less energy and can advance the materials with lower pressure than has been the case heretofore.

Yet a further object of our invention is to provide an improved apparatus for advancing highly viscous and dough-like consistency materials to the worm of an extruder or the chamber of an injection molding machine whereby drawbacks of prior art systems are avoided.

SUMMARY OF THE INVENTION

These objects and others which will become apparent hereinafter are attained, in accordance with the present invention in an apparatus for feeding a viscous material which comprises:

a viscous material displacing device comprising a cylindrical chamber and a member movable in the chamber for displacing a viscous material fed to the chamber through an outlet at an end thereof; and a feeder for supplying the viscous material to the chamber, the feeder comprising:

an inlet funnel rotatable about a funnel axis generally transverse to an axis of the cylindrical chamber and receiving the viscous material, the funnel being constituted as a body of revolution rotatable about the funnel axis and centered thereon, the body of revolution having a generatrix at an inclination of an acute angle $\alpha$ with the funnel axis, a feed worm lying along the body of revolution and inclined at the angle $\alpha$ to the funnel axis for advancing the viscous material from the funnel to the chamber, and a linear passage coaxial with and receiving the feed worm and connecting the funnel to the chamber whereby the feed worm opens directly into the chamber.

More particularly, the combination of the invention, in which the funnel is rotated about its axis and is formed as a body of revolution along a generatrix of which the feed worm can extend at an inclination angle $\alpha$ and whereby the feed worm opens directly into the extruder or metering worm or the cylinder of the injection molding unit, surprisingly, is able to provide a significant number of advantages over the earlier system.

For example, the viscous material can be displaced into the extruder or injection molding chamber at a relatively low pressure of about 5 to 10 bar, thereby allowing the system to operate with reduced drive power. The specific throughput is increased. For example, in the case of injection molding machines, the cycling time can be greatly reduced. The degree of filling can be increased and precise volumetric metering by the extruder or metering worm is possible.

With heating of the funnel and the feed worm, it is, for example, possible to operate with recycled plastic materials alone or together with other plastics so that new types of plastic articles can be fabricated.

The same applies to operations with a variety of fillers. Of the greatest significance is the fact that glass fiber reinforced plastic articles can be made with minimum damage to the fibers in injection molding processes.

According to a feature of the invention, the worm in its lower region extends substantially into the chamber or cylinder of the piston or worm of the injection molding or extruder device and practically into the path thereof while being cylindrically enclosed in the aforementioned passage which is coaxial with the feed worm and can extend about one-third of the total feed length of this feed worm or screw.

The longitudinal axis of the feed worm can have the same inclination angle as the flight of the extruder worm and the diameter d of the feed worm can be related to the pitch g by the relationship $d = g \times \cos\alpha$.

The feed worm can have a conical tip which can lie practically flush with the cylinder of the extruder worm or injection molding piston and can lie proximal to this cylinder, parallel to the axis thereof. Advantageously, the axis of the funnel is perpendicular to the axis of the extruder worm.

It has been found to be advantageous, moreover, to brace the feed worm over at least part of its length, by a semicylindrical pocket into which the glass fiber-filled synthetic resin is forced by the feed worm along its path into the passage.

The funnel, the bracket, the feed worm and the extruder worm can all be provided with heating means and can be associated with temperature control units for maintaining predetermined temperatures of these elements. The feed worm can be internally heated with a heating cartridge while the funnel, the pocket and the extruder worm can be externally heated by heating jackets. We can monitor the pressure at the mouth of the feed worm where it discharges into the extruder or injection cylinder with a pressure-measuring sensor for controlling the speed of the feed worm.

According to a further feature of the invention, the filling funnel at its top is hermetically sealed by means of a charging cover which can be provided with an evacuating device for withdrawing vapors or gases emitted by the synthetic resin material.

For example, once the material to be processed is fed through the filling shaft or cover into the funnel and the funnel is closed, the mass therein is hermetically sealed from the ambient. Volatile components, for example styrene in the case of wet polyester, or water vapor in the case of the processing of glass fiber-reinforced polyamides, can be drawn off by suction.

The ability to maintain the temperature of the mass allows operation of glass fiber-reinforced polypropylene which should be held at a constant charging temperature of say 200° C.

The feed screw or worm draws the material from the funnel in a uniform and homogeneous manner into the extruding or injection unit without damage to the fibers and a uniform feed rate can be ensured by the use of the aforementioned pressure sensor.

One of the important advantages of the system of the present invention is that the flow of the material from the funnel to the outlet of the extruder or metering worm can be effected without dead spaces in a practically closed system with uniform pressure buildup at very high throughputs and with a low drive energy. With extruder units continuous operation with a uniform degree of filling can be obtained and injection molding units can operate in a quasicontinuous mode.

BRIEF DESCRIPTION OF THE DRAWING

The above and other objects, features and advantages of the present invention will become more readily apparent from the following description, reference being made to the accompanying drawing in which:

FIG. 5 is a section similar to FIG. 1 showing the application of the invention to an injection molding piston-and-cylinder arrangement, while

SPECIFIC DESCRIPTION

Figure 1:
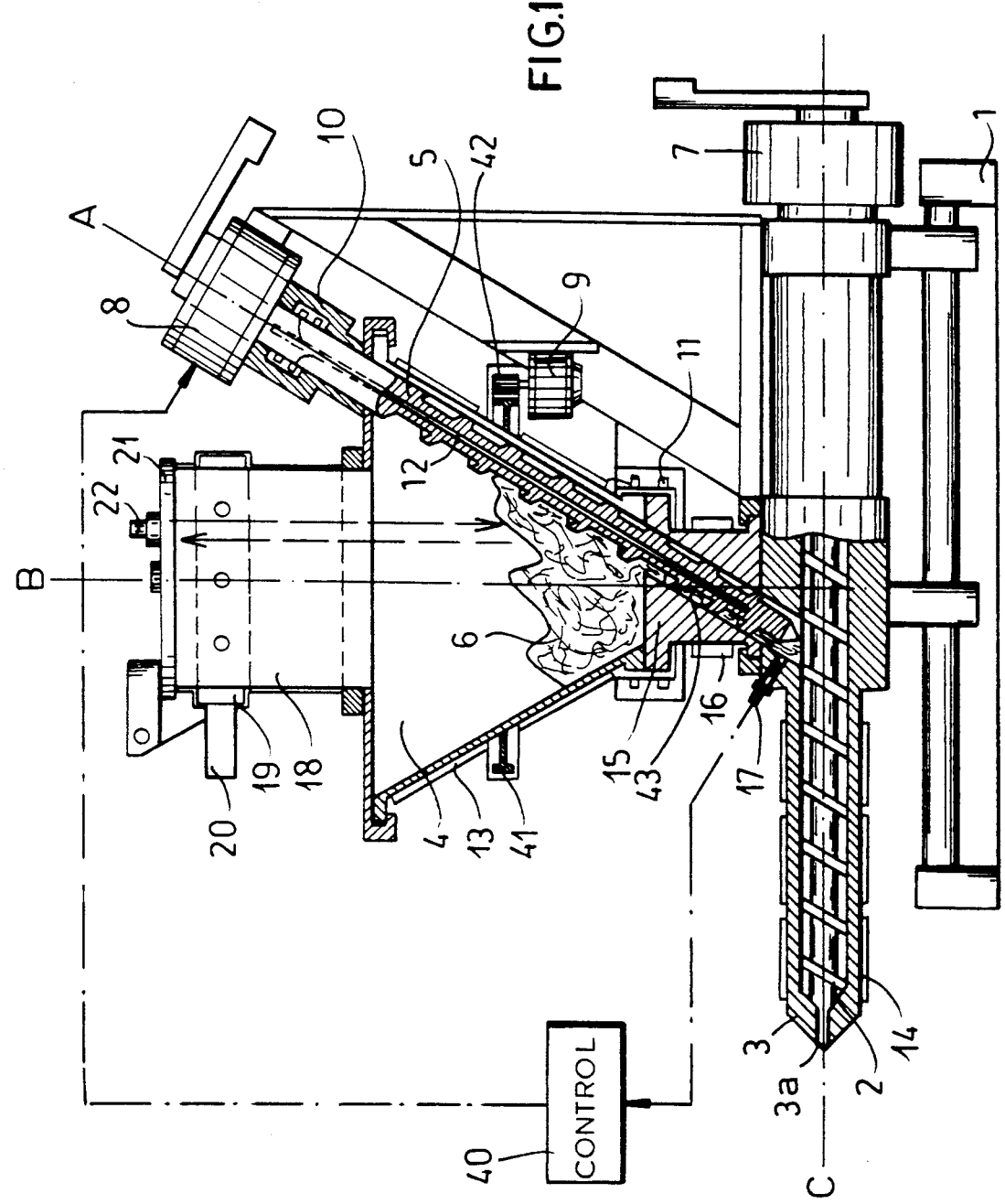
FIG. 1 is a vertical section through a feed system in accordance with the invention.

FIG. 1 shows an injection molding unit having a metering worm 2 and a worm cylinder 3 above which a feed funnel 4 is disposed with a feed worm 5.

The metering worm 2 has an outlet 3a and thus forms an extruder for the mass which is fed to an injection piston or directly to an injection mold if the worm 2 is axially displaceable to discharge the material into a mold.

The funnel 4 receives the mass 6, which can be glass-fiber-filled synthetic resin material.

The metering or extruder worm 2 is driven by a motor 7 while the feed worm 5 is driven by a motor 6 operated by a motor control 40 receiving an input from a pressure sensor 17.

The funnel 4 is journaled for rotation about an axis B and carries a gear 41 meshing with a pinion of a motor 9 which can drive the funnel in rotation about the axis B. In a driven region of the feed worm 5, a slip-ring arrangement 10 is provided while at a lower region of the funnel 4 a slip ring arrangement 11 is disposed to feed electric current to a respective heat-control elements 12 and 13 of the feed worm and the funnel. The heat control element of the feed worm 5 is a cartridge 12 extending within the feed worm and thus internally heating same. The heating element in the case of the funnel 4 is a heating jacket. The temperature sensors for these heaters have not been illustrated.

Around the worm cylinder 3, a further heating jacket 14 is provided and a bracket 15 upon which the funnel 4 is rotatably mounted, can have still another heating jacket 16 for maintaining the temperature of the synthetic resin mass.

The sensor 17 extends into the mouth of the feed worm 5 where it opens into the metering worm or extruder worm 2 so that the control of the speed of the feed worm 5 can be effected in response to pressure and thus the pressure can be maintained constant and the feed rate controlled accordingly.

Above the funnel 4, a feed shaft 18 is provided, the feed shaft being equipped with a suction ring 19 in a fitting 20 connected to a suction pump. The feed shaft is equipped, in turn, with a charging cover 21. A level measuring device 22 can be mounted in the cover 21 to ultrasonically determine the degree of filling of the mass 6 in the funnel so that, should this mass fall below a predetermined level, the cover can be opened and additional material supplied.

Once the cover is closed, of course, the vapors emitted by the mass can be evacuated at 20.

Figure 3:
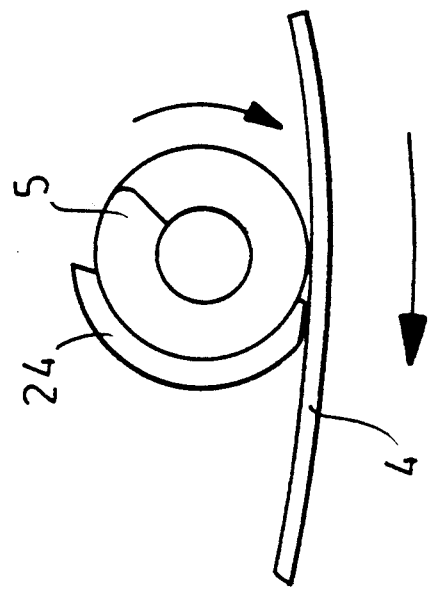
FIG. 3 is an end view of the device shown in FIGS. 2.
Figure 2:
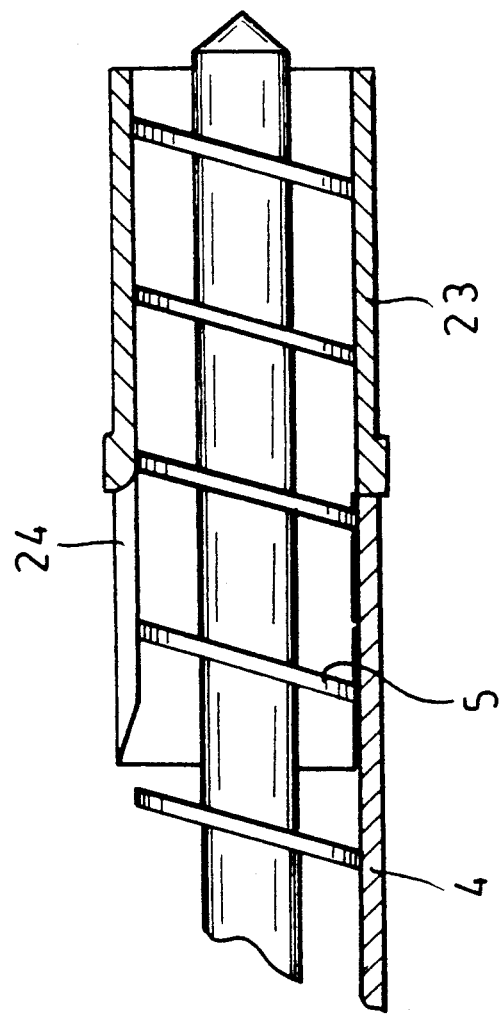
FIG. 2 is a sectional view of the lower end of the feed worm with an intake pocket according to the invention.

As can be seen from FIG. 1, the lower end of the feed worm 5 can extend through a passage 43 in the bracket 15 which passage can extend over about one-third of the feed length of the worm 5. FIGS. 2 and 3 show that the lower end of the feed worm, before it enters a cylinder bushing 23 which can form this passage, can be supported by a substantially semicylindrical shell 24 forming an intake pocket and bracing the worm 5 against bending. The worm 5 and the intake pocket 24 lie along the generatrix of the funnel 4, the arrows in FIG. 3 representing the directions of rotation of the members 4 and 5.

Figure 4:
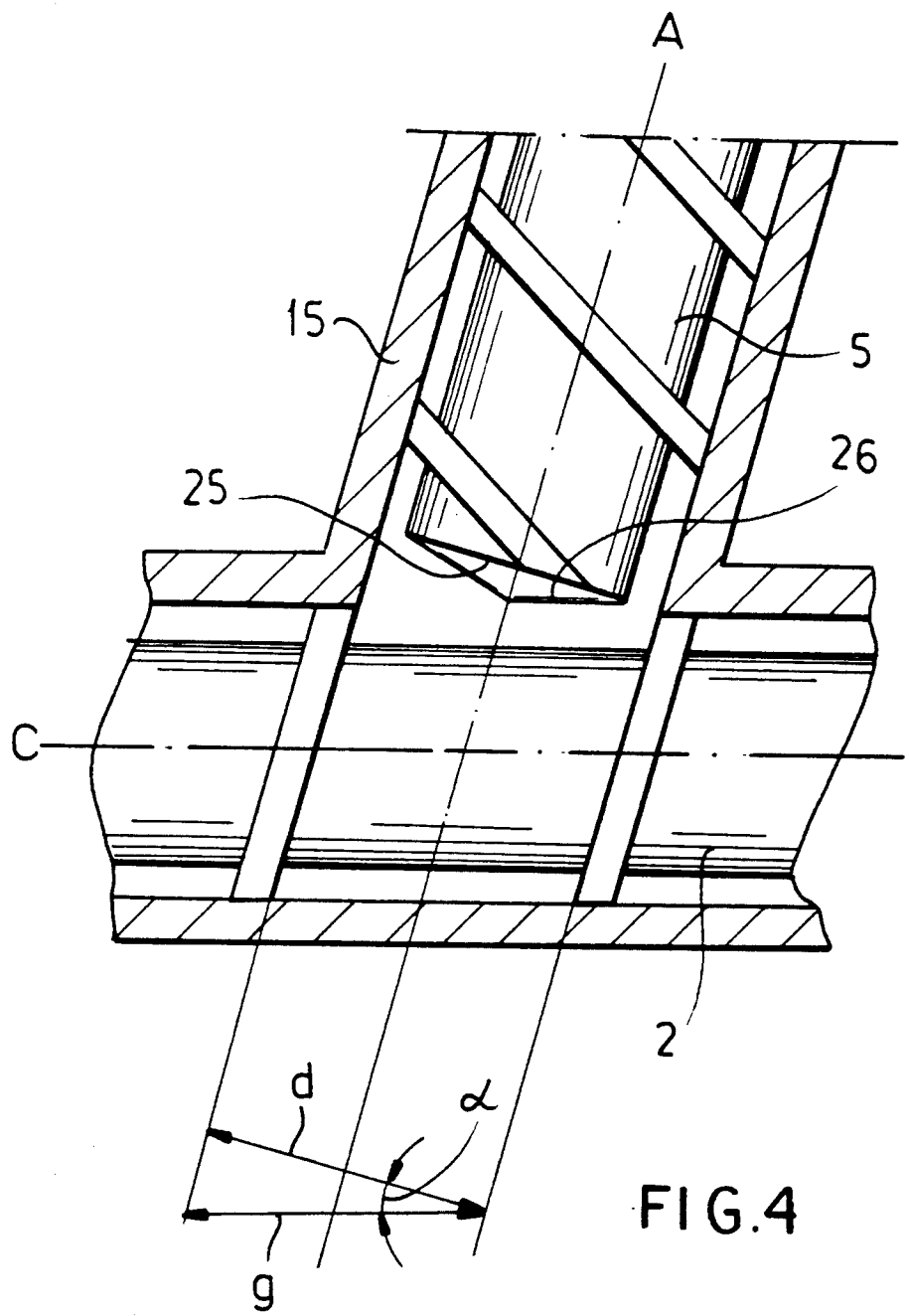
FIG. 4 is a diagram of relationships at the mouth of the feed worm opening into the extruder or metering worm.

According to FIG. 4, the worm 5 has a conical tip 25 with a surface 26 which, proximal to the worm 2 lies parallel to the axis C thereof. The diameter d of the worm, the angle of inclination $\alpha$ and the pitch g of the worm 2 are approximately defined by the relationship $d = g \times \cos \alpha$. The angle $\alpha$ is defined between axis A of the worm 5 and the axis B of the funnel 4 which is perpendicular to the axis C of the worm 2.

Figure 5:
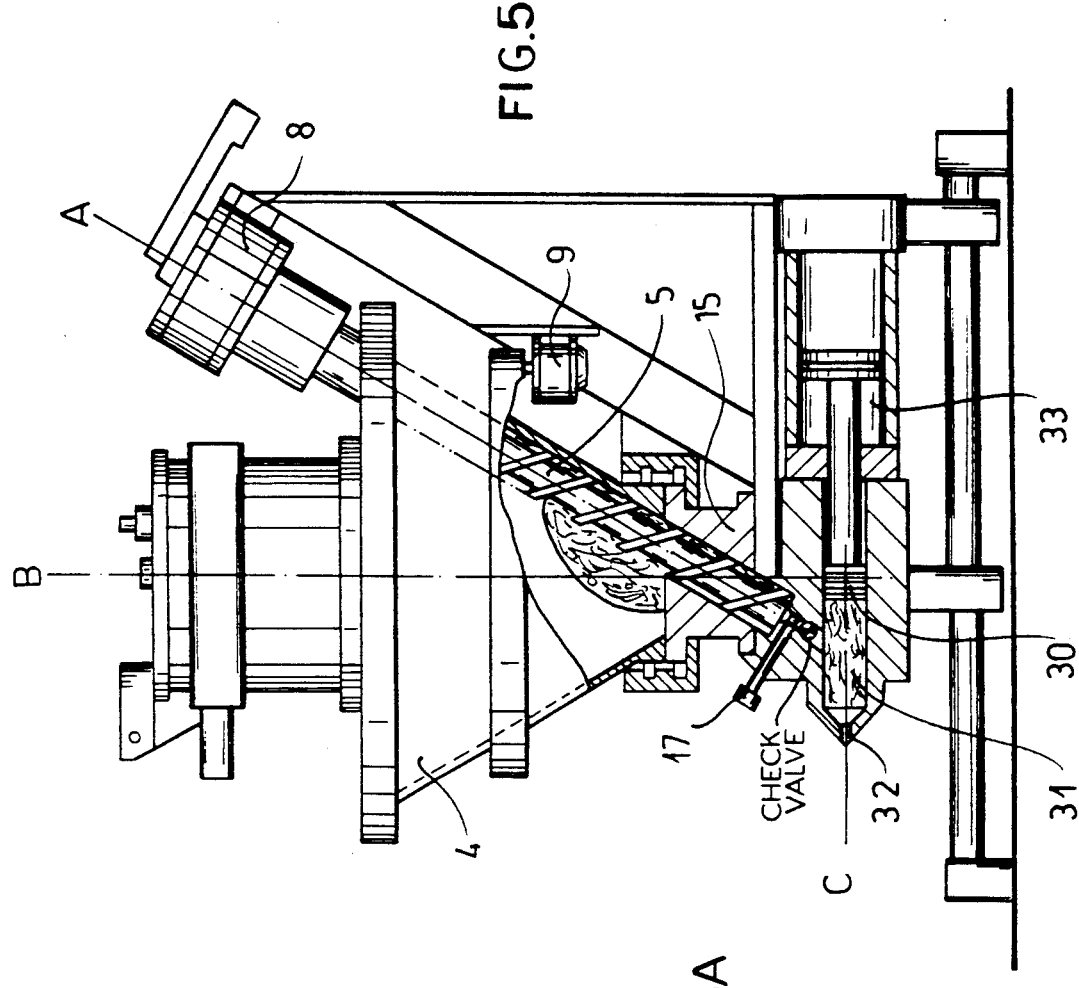
Figure 5A:
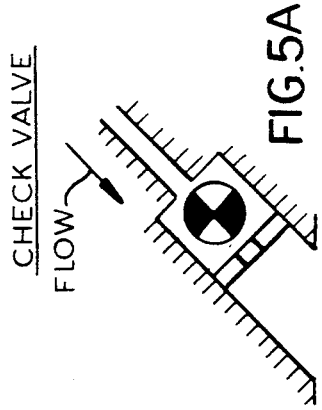
FIG. 5A is a detailed view of the check valve of FIG. 5.

In FIG. 5, we have shown a system generally similar to that of FIG. 1 but wherein the worm 5 opens directly into a cylinder 31 of an injection molding head whose piston 30 is displaced by a hydraulic cylinder 33 to drive the synthetic resin through an outlet 32 into the injection mold. In this case, the axis of the funnel 4 is perpendicular to the axis C of the cylinder 31.

In operation, of course, the material to be extruded or injection molded is discharged from the funnel directly, i.e. without passage through any pipe connection or elbow.

We claim:

1. An apparatus for extruding a viscous material comprising:
   a viscous material displacing device comprising a cylindrical chamber and a member movable in said chamber for displacing a viscous material fed to said chamber through an outlet at an end thereof; and
   a feeder for supplying said viscous material to said chamber, said feeder comprising:
   an inlet funnel rotatable about a funnel axis generally perpendicular to a longitudinal axis of said cylindrical chamber and receiving said viscous material, said funnel being constituted as a body of revolution rotatable about said funnel axis and centered thereon, said body of revolution having a generatrix at an inclination of an acute angle $\alpha$ with said funnel axis, a feed worm lying along said body of revolution and inclined at said angle $\alpha$ to said funnel axis for advancing said viscous material from said funnel to said chamber, and
   a linear passage coaxial with and receiving said feed worm and connecting said funnel to said chamber whereby said feed worm opens directly into said chamber.

2. The apparatus defined in claim 1 wherein said chamber comprises a cylinder, a piston and an injection molding machine and said piston is axially displaceable in said cylinder to eject said viscous material in a form of a vapor-filled synthetic resin through said outlet.

3. The apparatus defined in claim 1 wherein said chamber is a cylinder of an extruder receiving an extrusion worm for displacing said viscous material through said outlet of said chamber, said viscous material being a fiber-filled synthetic resin.

4. The apparatus defined in claim 3 wherein said passage completely surrounds said feed worm at a lower region thereof until said feed worm meets said cylinder and is formed in a bracket supporting said funnel.

5. The apparatus defined in claim 4 wherein said passage extends along said feed worm over substantially one-third of the total feed length of said worm.

6. The apparatus defined in claim 4 wherein said feed worm has a longitudinal axis, said cylinder being coaxial with said cylindrical chamber, said longitudinal axis of said feed worm being inclined to the longitudinal axis of said cylindrical chamber at the same angle as a pitch angle of said extruder worm.

7. The apparatus defined in claim 4 wherein the diameter d of said feed worm and the pitch g of a flight of said extruder worm are related in accordance with the relationship $d = g \times \cos \alpha$.

8. The apparatus defined in claim 4 wherein said feed worm has a conical tip so oriented that the surface of said tip proximal to said extruder worm is approximately parallel to said axis of said cylindrical chamber and the longitudinal axis of said extruder worm.

9. The apparatus defined in claim 4 wherein said funnel axis is perpendicular to said axis of said cylindrical chamber.

10. The apparatus defined in claim 4, further comprising a semicylindrical shell surrounding said feed worm over at least a portion of length thereof and supporting said feed worm against bending while forming a pocket into which said feed worm draws said synthetic resin for advancing said resin to said cylinder.

11. The apparatus defined in claim 4, further comprising means for controlling the temperatures of said funnel, said bracket, said feed worm and said extruder worm.

12. The apparatus defined in claim 11 wherein said feed worm is provided with an internal heating cartridge for control of the temperature of said feed worm and said funnel, said bracket and said extruder worm are provided with external heating jackets.

13. The apparatus defined in claim 4, further comprising a pressure-measurement sensor monitoring pressure at a mouth of said feed worm communicating with said cylinder and means connected with said sensor for controlling a speed of said feed worm in response to a pressure measured by said sensor.

14. The apparatus defined in claim 4, further comprising a charging cover on said funnel providing a gas-tight seal thereon.

15. The apparatus defined in claim 14, further comprising means for evacuating said cover communicating with said funnel through said cover.

* * * * *